United States Patent [19]
Abbott

[11] 3,941,767
[45] Mar. 2, 1976

[54] METHOD OF PREPARING POWDERED ELASTOMER COMPOSITIONS

[75] Inventor: Thomas P. Abbott, Peoria, Ill.

[73] Assignee: The United States of America as represented by the Secretary of Agriculture, Washington, D.C.

[22] Filed: May 5, 1975

[21] Appl. No.: 574,677

[52] U.S. Cl... 260/17.2; 260/17.4 BB; 260/17.4 ST; 260/742; 260/749
[51] Int. Cl.$^2$........................ C08L 3/04; C08L 3/06
[58] Field of Search..... 260/17.2, 17.4 ST, 17.4 BB, 260/742, 749

[56] References Cited
UNITED STATES PATENTS

| | | | |
|---|---|---|---|
| 3,296,158 | 1/1967 | Dimitri | 260/17.5 |
| 3,442,832 | 5/1969 | Buchanan et al. | 260/17.4 |
| 3,645,940 | 2/1972 | Stephens et al. | 260/17.4 |
| 3,673,136 | 6/1972 | Buchanan et al. | 260/17.4 |
| 3,714,087 | 1/1973 | Buchanan et al. | 260/17.2 |
| 3,830,762 | 8/1974 | Abbott | 260/17.2 |

*Primary Examiner*—Donald E. Czaja
*Assistant Examiner*—Edward Woodberry
*Attorney, Agent, or Firm*—M. Howard Silverstein; Max D. Hensley; David G. McConnell

[57] ABSTRACT

An improved process is used to prepare encased powdered elastomers which replace slab rubber in injection molding formulations and thereby eliminates the need for milling and high shear mixing. A composition is obtained which is easily blended and is capable of being automatically fed to injection molding machines, and which contains less encasement compound than prior art powdered elastomers having similar nonagglomerating and free-flowing properties.

6 Claims, No Drawings

METHOD OF PREPARING POWDERED ELASTOMER COMPOSITIONS

BACKGROUND OF THE INVENTION

The invention relates to a method of preparing powdered elastomer compositions which is an extension of and an improvement over the methods described in commonly assigned U.S. Pat. Nos. 3,830,762; 3,442,832; 3,480,572; 3,645,940; 3,673,136; and 3,714,087 which are incorporated herein by reference.

The invention has for its objects and advantages all the objects and advantages disclosed in U.S. Pat. No. 3,830,762, supra. It is a further object of the invention to provide a method of preparing powdered elastomer compositions which contain sufficient amounts of encasement compounds to completely encase the elastomer particles leaving them nontacky and, therefore, nonagglomerating and free flowing (T. P. Abbott et al., "Starch-Encased Rubbers: Injection Molding of Conventional Powdered Rubber Formulations," J. Elastomers Plast., April 1975, incorporated herein by reference).

In accordance with the above objects, I have discovered in a process for preparing powdered elastomer compositions having the following steps:

a. coprecipitating from 3 to 19 parts of a first encasement compound selected from the group consisting of starch xanthate and zinc starch xanthate having xanthate degrees of substitution of from 0.2 to 3.0, cationic starch and their cereal flour analogs with 100 parts of solids contained in a latex selected from the group consisting of natural rubber latex, butadiene-acrylonitrile rubber latex, styrene-butadiene rubber latex, chloroprene rubber latex, polybutadiene rubber latex, oil-extended styrene-butadiene rubber latex, and phenolformaldehyde-extended nitrile rubber latex to form a coprecipitate having a particle diameter of about 1 mm.;

b. filtering and water washing the coprecipitate resulting from (a);

c. washing the coprecipitate resulting from (b) with a water-miscible solvent;

d. filtering the washed coprecipitate resulting from step (c); and e. repeating steps (c) and (d) until the filtrate resulting from step (d) contains from 0 to 10 percent water;

an improvement comprising, as an additional step prior to step (c), supra, resuspending the coprecipitate resulting from step (b), supra, in water and precipitating, in the presence of the resuspended coprecipitate, from 1 to 17 parts per 100 parts of latex solids (phr) of a second encasement compound selected from the group consisting of starch xanthate and zinc starch xanthate having xanthate degrees of substitution of from 0.2 to 3.0, cationic starch, their cereal flour analogs, and sodium stearate, the total amount of first and second encasement compounds being from 4 to 20 phr. Steps (c) through (e), supra, constitute "dehydration of the doubly encased elastomer coprecipitates."

An added advantage of the invention is the provision of nontacky powdered elastomer compositions encased in starch-containing compounds in amounts sufficiently low so that the starch contained therein does not act as a filler. In quantities of less than 8 phr, starch has little or no effect on the properties of filled vulcanized rubber, and only small effects on nonfilled rubber (e.g., gum rubber). When powdered elastomer containing over 10 phr starch are used to replace slab rubber in injection molding compositions, the amount of filler in the formulation must be adjusted to compensate for the amount of starch. The amounts of other ingredients also may have to be adjusted to obtain a rubber product having the desired properties.

DETAILED DESCRIPTION OF THE INVENTION

The basis of the invention lies in the double encasement of latex solids with suitable encasement compounds. The first encasement is accomplished by any of the methods disclosed in U.S. Pat. Nos. 3,830,762; 3,442,832; 3,480,572; 3,645,940; 3,673,136; and 3,714,087, supra.

The preferred starting materials for the coprecipitate include the following:

1. Elastomer (i.e., rubber) latex: natural, styrene-butadiene (SBR), acrylonitrile-butadiene (NBR), chloroprene (CR), polybutadiene, and oil-extended SBR [see Kirk and Othmer Encyclopedia of Chemical Technology, Vol. 7, pp. 676–716, and Vol. 17, pp. 660–684, The Interscience Encyclopedia, Inc., New York (1965) for a discussion of natural and synthetic elastomers];

2. First encasement compounds: starch xanthate, zinc starch xanthate, cationic starches such as aminoalkyl and quaternary ammonium alkyl ether derivatives of starch [see Starch: Chemistry and Technology, ed. Whistler and Paschall, Vol. II, Chapter 16, Academic Press, New York (1967)], cationic starch graft copolymers of the type described in U.S. Pat. No. 3,669,915, and cereal flour analogs of the above;

3. Precipitation reagents: $ZnSO_4$, $ZnCl_2$, or the equivalent mineral acid.

It is preferred that the coprecipitates contain from 3 to 19 phr of the first encasement compounds. Phr is herein defined as parts per hundred parts of rubber (i.e., elastomer) solids on a dry basis. The upper limit on loading for the first encasement compound is determined by the amount of compound required to obtain essentially complete encasement of the latex particles. Before coprecipitation, latex particles are approximately 0.05 $\mu$ in diameter. Theoretically, complete encasement of a latex particle of this size would require approximately 26 percent encasement compound based on particle volume, which would be a coprecipitate having an encasement loading of about 20 to 30 phr. Incompletely encapsulated coprecipitates tend to be tacky which causes them to agglomerate and become less free flowing. This effect is seen in screen analyses of dried, singly encased, coprecipitated products where from 35 to over 50 percent of particles containing 20 phr or less encasement compound were larger than 2,380 $\mu$ in diameter while 100 percent of particles containing from 30 to 45 phr were smaller than 2,380 $\mu$ (Table 1, U.S. Pat. No. 3,830,762, supra). In storage tests, the singly encased particles having from 3 to 10 phr starch xanthide were compressed with a force of from 2 to 10 p.s.i. for 16 hours. In all tests the particles had agglomerated into cohesive masses that had to be broken up by hand before they could be fed into a blender with other compounding ingredients. This same characteristic is evident in the compositions immediately after drying, where the singly encased particles having 20 phr or less first encasement loading had agglomerated into a sheet. On the other hand, doubly encased compositions prepared according to the invention did not agglomerate after drying or after compression, and did not require high shear mixing to break up the particles.

The lower limit on first encasement loading depends on the fact that amounts of encasement compound of about 3 phr and above result in an encased wet coprecipitate having particle diameter of approximately 1 mm. Wet coprecipitates are those compositions which have been coprecipitated as described herein for the first encasement, from which the aqueous reaction medium has been removed, and which have been washed with water and drained.

Where 0.05 μ latex particles required from 20 to 30 phr of encasement compound for complete encasement, 1 mm. singly encased particles required only about 1 phr of encasement compound to achieve the same result due to the much smaller surface to volume ratio of the larger particles. Therefore, the lower limit for second encasement loading is 1 phr, giving a lower limit of total loading of 4 phr to achieve essentially total encasement of latex particles. It is preferred that total encasement loading be from 4 to 8 phr in order to obtain a product which could be used directly in standard formulations without changing the properties of the resulting vulcanized rubber. Total encasement loadings of from 4 to 6 phr appear to provide optimum results.

All of the compounds which are suitable for the first encasement are suitable for the second encasement along with sodium stearate. The same precipitation agents are used for both first and second encasements. Calcium chloride is used to precipitate sodium stearate. Xanthate degrees of substitution of from 0.2 to 3.0 are suitable for all xanthates containing encasement compounds.

For dehydration of the doubly encased elastomer coprecipitates, any water-miscible alcohol or other completely water-miscible solvent such as acetone, methyl ethyl ketone, isopropanol, dimethyl sulfoxide, tetrahydrofuran, ethanol, or dioxane is suitable. However, methanol or ethanol is preferred because of their economy, ready availability, and particularly their ease of recovery from aqueous solution for recycling in the process. Temperature for the dehydration is not critical; it is convenient to work in the range below the boiling point of the solvent or under ambient conditions. If the coprecipitate contains more than 10 percent water by weight after the first water-miscible solvent washing step, the washing step was repeated until the coprecipitate contains from 0 to 10 percent water by weight. Solvents used for the first washing step can contain up to 40 percent water by weight. This allows solvents from subsequent washings to be recycled back to the first washing step in a continuous or semicontinuous operation.

After dehydration, the solid products are very readily recovered by most conventional filtration, centrifugation, or decantation methods. Products may then be dried in conventional forced draft or vacuum ovens. However, fluidized bed drying is preferred because of its rapidity and economy and because it is a continuous process.

Polysaccharide-elastomer masterbatch compositions of the instant invention are compounded with the normal rubber additives. Polysaccharides function alone as reinforcing agents, but a combination of polysaccharides and one or more other reinforcing agents or fillers is preferred. Additives useful for compounding with the instant compositions include carbon black, lignin, phenolic resins, sulfur, zinc oxide, organic dyes, clay, reinforcing silica, vulcanization agents, lubricants, antioxidants, and plasticizers.

Compounding of this invention's powdered polysaccharide-elastomer masterbatches may be accomplished by mixing in V or ribbon blenders if the added ingredients are fine powders. If flakes, pelletized, or encapsulated ingredients are added, highspeed rotary blade powder mixers of the Waring or Henschel type are preferred. Many rubber compounding ingredients can be incorporated into the powdered masterbatches by adding them to the polysaccharide solution-latex mixture before coprecipitation. It is particularly advantageous to incorporate lignin, phenolic resins, and carbon blacks in this way. Precaution is necessary when antioxidants and plasticizers are added before coprecipitation as water-miscible solvent-soluble materials can be extracted and lost during the subsequent dehydration procedure. These soluble ingredients of the latex suspension, which normally remain in the coprecipitate and are useful in the finished rubber (e.g., stearic acid), can be added back to the composition after the solvent wash. The powdered elastomer compounds of this invention may be shaped into compression mold blanks or into fully fabricated articles by direct extrusion from powder feed. However, they are most advantageously fabricated directly from powdered compound by highspeed automatic injection molding, but for this a screw plasticator injection molding machine would be preferred over a ram operated type.

The following examples are included to further illustrate the invention and are not to be construed as limitations thereto. Each specific elastomer latex disclosed in the examples will be designated by its ASTM designation (e.g., SBR 1502, CR Type 571, etc.), and all rubber testing will be done by ASTM standard methods (1969 *Book of ASTM Standards*, Part 28, American Society for Testing and Materials, Philadelphia, Pennsylvania, 1969).

All parts and percentages described herein are by weight unless otherwise specified.

EXAMPLE 1

A doubly encased powdered elastomer composition was prepared as follows:

A. First encasement: 3 phr.

Four thousand grams of the SBR 1502 latex (20 percent solids) were stirred with 240 g. of the starch xanthate solution (10 percent solids, xanthate D.S. 0.34). Then 1.1 g. of sodium nitrite was added, followed by dropwise addition of a 1M sulfuric acid solution until the mixture reached pH 2.0. This quantitatively coprecipitated starch xanthide and SBR as approximately 1-mm. curd particles. The mixture was stirred for 15 minutes, and sufficient NaOH was added to obtain pH of 7. The 1-mm. curd particles were collected on a cloth filter, then washed by slurrying in water and again collecting on a filter.

B. Second encasement: 2 phr.

An aqueous slurry of the wet coprecipitate was prepared to which was added 240 g. of the above starch xanthate solution and 1.2 g. $NaNO_2$. The mixture was stirred for 10 minutes.

The pH of the mixture was reduced to 2 with 1M $H_2SO_4$, and the particles were collected on a cloth filter, washed with water, and filtered as above.

C. Alcohol wash.

The coprecipitate was then suspended in ethanol with vigorous stirring for a few seconds to separate and partially dehydrate the individual coprecipitate particles. The coprecipitate was separated from the now wet alcohol by filtration, then resuspended in dry ethanol and stirred a few minutes to complete its dehydration. Extent of dehydration was determined by stirring the alcohol-coprecipitate slurry for a time sufficient to equilibrate the remaining water with the alcohol. The specific gravity of the filtrate was then compared to known alcohol-water mixtures. The alcohol dehydration step was repeated until the filtrate contains from 0 to 10 percent by weight water. The powdered product was then collected and dried at 70° C. in a vacuum oven to remove alcohol and residual water.

The resulting product was a free-flowing, nontacky powder containing a total of 5 phr starch xanthide. Screen analysis resulted in 51 percent of the powdered product passing through an 8-mesh screen.

EXAMPLE 2

A doubly encased powdered elastomer composition was prepared and recovered as described in Example 1 with the following constituents:
  A. First encasement: 4 phr.
  4,000 g. SBR 1502 latex (20 percent solids)
  320 g. starch xanthate solution (10 percent solids, xanthate D.S. 0.35)
  1.4 g. $NaNO_2$.
  B. Second encasement: 1 phr.
  80 g. starch xanthate solution
  0.5 g. $NaNO_2$.

The resulting product was a free-flowing, nontacky powder containing a total of 5 phr starch xanthide. Screen analysis resulted in 50 percent of the powder product passing through an 8-mesh screen.

EXAMPLE 3

A doubly encased powdered elastomer composition was prepared and recovered as described in Example 1 with the following constituents:
  A. First encasement: 4 phr.
  39.69 kg. SBR 1713 latex (19.4 percent solids)
  3.86 kg. Sunthene 0-120 oil (Sun Oil Company) was added to the latex along with the starch xanthate
  4.65 kg. starch xanthate solution (10 percent solids, xanthate D.S. 0.35)
  41.2 g. $NaNO_2$.
  B. Second encasement: 2 phr.
  2.3 kg. starch xanthate solution
  20.6 g. $NaNO_2$.

The resulting product was a free-flowing, nontacky powder containing a total of 6 phr starch xanthide.

EXAMPLE 4

A doubly encased powdered elastomer composition was prepared and recovered as described in Example 1 with the following constituents:
  A. First encasement: 4 phr.
  472 g. CR Type W latex (42 percent solids)
  80 g. starch xanthate solution (10 percent solids, xanthate D.S. 0.35)
  0.4 g. $NaNO_2$
  5.0 g. antioxidant emulsion (Agerite Stalite, R. T. Vanderbilt Company) 40 percent active added to the mixture after $NaNO_2$.
  B. Second encasement: 2 phr.
  40 g. starch xanthate solution
  0.2 g. $NaNO_2$
  2.5 g. antioxidant emulsion.

The resulting product was a free-flowing, nontacky powder containing a total of 6 phr starch xanthide.

EXAMPLE 5

A doubly encased powdered elastomer composition was prepared and recovered as described in Example 1 with the following constituents:
  A. First encasement: 4 phr.
  1,921 g. CR Type AD latex (41.6 percent solids)
  320 g. starch xanthate (1.0 percent solids, xanthate D.S. 0.34)
  1.4 g. $NaNO_2$.
  B. Second encasement: 1 phr.
  80 g. starch xanthate
  0.5 g. $NaNO_2$.

The resulting product was a free-flowing, nontacky powder containing a total of 5 phr starch xanthide.

EXAMPLE 6

A doubly encased powdered elastomer composition was prepared and recovered as described in Example 1 with the following constituents:
  A. First encasement: 5 phr.
  472 g. CR Type W latex (42 percent solids)
  100 g. starch xanthate (10 percent solids, xanthate D.S. 0.35)
  0.5 g. $NaNO_2$
  5.0 g. antioxidant emulsion (see Example 4)
  $Na_2CO_3$ to pH 5-7.
  B. Second encasement: 2 phr.
  4 g. sodium stearate in 1 liter $H_2O$
  3 g. $CaCl_2$.

The resulting product was a free-flowing, nontacky powder containing 5 phr starch xanthide and 2 phr calcium stearate.

EXAMPLE 7

A doubly encased powdered elastomer composition was prepared and recovered as described in Example 1 with the following constituents:
  A. First encasement: 5 phr.
  2,500 g. SBR 1502 latex (20 percent solids)
  250 g. starch xanthate solution (10 percent solids, xanthate D.S. 0.35)
  1.1 g. $NaNO_2$
  12.5 g. antioxidant emulsion (see Example 4)
  $Na_2CO_3$ to pH 6-7.
  B. Second encasement: 2 phr.
  10 g. sodium stearate in 1 liter $H_2O$
  7.5 g. $CaCl_2$.

The resulting product was a free-flowing, nontacky powder containing 5 phr starch xanthide and 2 phr calcium stearate.

EXAMPLE 8

A doubly encased powdered elastomer composition was prepared and recovered as described in Example 1 with the following constituents:
  A. First encasement: 5 phr.
  4,000 g. SBR 1502 latex (20 percent solids)
  400 g. starch xanthate (10 percent solids, xanthate D.S. 0.35).
  B. Second encasement: 2 phr.
  160 g. starch xanthate
  0.7 g. $NaNO_2$.

The resulting product was a free-flowing, nontacky powder containing a total of 7 phr starch xanthide. Screen analysis resulted in 71 percent of the product passing through an 8-mesh screen.

EXAMPLE 9

Doubly encased powdered elastomer compositions were prepared and recovered as described in Example 1 with the following composition:

A. First encasement: 3 phr.
4,000 g. SBR 1502 latex (20 percent solids)
240 g. starch xanthate (10 percent solids, xanthate D.S. 0.35)
1.2 g. $NaNO_2$.

The resulting singly encased product was divided into four equal portions ($A_1$, $A_2$, $A_3$, and $A_4$).

A'. 4 phr. First encasement A was repeated with 3,000 g. SBR 1502 latex and divided into three equal portions ($A'_1$, $A'_2$, and $A'_3$).

A''. 5 phr. First encasement A was repeated with the following composition, 2,000 g. SBR 1502 latex, 200 g. starch xanthate, and 1.0 $NaNO_2$ and divided into two equal portions ($A''_1$, $A''_2$).

B. Second encasement.

| First encasement Product | phr | Second encasement SX[1] | $NaNO_2$ g. | phr | Screen analysis, % through 8 mesh |
|---|---|---|---|---|---|
| $A_1$ | 3 | 40 | 0.2 | 2 | 74 |
| $A_2$ | 3 | 60 | 0.3 | 3 | 75 |
| $A_3$ | 3 | 80 | 0.4 | 4 | 78 |
| $A_4$ | 3 | 100 | 0.5 | 5 | 73 |
| $A'_1$ | 4 | 20 | 0.1 | 2 | 78 |
| $A'_2$ | 4 | 30 | 0.15 | 3 | 81 |
| $A'_3$ | 4 | 40 | 0.2 | 4 | 78 |
| $A''_1$ | 5 | 80 | 0.4 | 2 | 79 |
| $A''_2$ | 5 | 120 | 0.6 | 3 | 82 |
| Control[2] | 5 | — | — | — | 56 |
| Control[2] | 6 | — | — | — | 51 |
| Control[2] | 7 | — | — | — | 51 |
| Control[2] | 8 | — | — | — | 48 |

[1] SX = starch xanthate, 10 percent solids.
[2] Singly encased with starch xanthate having a xanthate D.S. of 0.35 according to the method described in U.S. Patent 3,830,762.

The above doubly encased compositions were free-flowing, nontacky powders.

EXAMPLE 10

A doubly encased powdered elastomer composition was prepared and recovered as described in Example 1 with the following composition:

A. First encasement: 3 phr.
3,000 g. SBR 1502 latex (20 percent solids)
180 g. starch xanthate (10 percent solids, xanthate D.S. 0.35)
0.9 g. $NaNO_2$.
B. Second encasement: 3 phr.
180 g. starch xanthate (10 percent solids, xanthate D.S. 0.10)
0.9 g. $NaNO_2$.

The resulting product was a free-flowing, nontacky powder containing a total of 6 phr starch xanthide.

EXAMPLE 11

A doubly encased powdered elastomer composition was prepared and recovered as described in Example 1 with the following composition:

A. First encasement: 4 phr.
2,886 g. NBR 5529 (21.8 percent solids)
240 g. starch xanthate (10 percent solids, xanthate D.S. 0.35)
1.0 g. $NaNO_2$.
B. Second encasement: 2 phr.
120 g. starch xanthate
0.5 g. $NaNO_2$.

The resulting product was a free-flowing, nontacky powder containing a total of 6 phr starch xanthide.

EXAMPLE 12

Rubber formulations were prepared from the powdered elastomer compositions from Examples 1, 2, and 8 according to ASTM Standard D15 from 100 parts elastomer composition, 5 parts ZnO, 2 parts sulfur, 1.75 parts benzothiazyl disulfide, and 1.5 parts stearic acid. No reinforcing carbon black was used.

Instead of using the method of mixing described in ASTM D15-18.2, all of the ingredients were mixed by shaking them together in a plastic bag. This mixture was poured through a narrow nip of the differential roll mill, banded, cut three times on each side, and passed endwise seven times. The rubbers were tested according to ASTM D412, Table 1.

EXAMPLE 13

Rubbers were prepared as described in Example 12 from the powdered elastomer compositions of Examples 2 and 7 and singly encased powdered elastomers containing 20 phr starch xanthate prepared from SBR 1502 latex according to U.S. Pat. No. 3,830,762. A control sample containing no starch xanthate was prepared from slab SBR 1502 in accordance with ASTM D15 using the procedure described in D15-18.2. One hundred parts of Examples 2, and 7, and the slab SBR 1502 each were mixed with 50 parts IRB No. 3 carbon black, 5 parts ZnO, 2 parts sulfur, 1.75 parts benzothiazyl disulfide, 1.5 parts stearic acid, and 1 part phenyl-betanaphthylamine in the manner described in Example 12 for powdered and slab rubber. One hundred twenty parts of the singly encased 20 phr powdered elastomer were mixed with the same ingredients and in the same manner except the amount of carbon black was reduced to 30 parts. The resulting rubbers were tested in accordance with ASTM D412, Table 2.

EXAMPLE 14

Rubber was prepared and tested as described in Example 12 from 100 parts of powdered elastomer composition of Example 5, 50 parts carbon black, 5 parts ZnO, 2 parts sulfur, 1.75 parts benzothiazyl disulfide, 1.5 parts stearic acid, and 1 part phenyl-beta-naphthylamine. The resulting rubber had the following physical characteristics: moduli 100 percent = 360, 300 percent = 1,300; percent elongation = 422; tensile = 2,580 p.s.i.; set (10 minutes) = 20 percent.

EXAMPLE 15

One hundred parts of the powdered elastomer composition of Example 3 were mixed with 50 parts IRB No. 3 carbon black, 1 part phenyl-beta-naphthylamine, 1 part stearic acid, 4 parts ZnO, 2 parts sulfur, 0.75 part benzothiazyl disulfide, 0.75 part diphenyl guanidine, and 5 parts naphthenic oil. The dry ingredients were blended for 60 seconds in a Prodex-Henschel 2JSS high intensity mixer. The liquid ingredients were added to the mixture and blended an additional 30 seconds. One hundred twenty parts of a singly encased oe (oil extended) SBR 1713 powdered elastomer containing 20 phr starch xanthide were added Table 1

| Rubber (Example No. of powdered elastomer) | Encasement phr 1st | 2nd | Moduli 100% | 300% | Elongation, % | Tensile, p.s.i. | Set (10 min.) % |
|---|---|---|---|---|---|---|---|
| 1 | 3 | 2 | 210 | 470 | 400 | 600 | 10 |
| 2 | 4 | 1 | 190 | 410 | 370 | 520 | 5 |
| 8 | 5 | 2 | 200 | 430 | 360 | 510 | 5 |

Table 2

| Rubber | Encasement phr 1st | 2nd | Moduli 100% | 300% | Elongation, % | Tensile, p.s.i. | Set (10 min.), % |
|---|---|---|---|---|---|---|---|
| Example 2 | 4 | 1 | 680 | 3,050 | 300 | 3,050 | 12 |
| Example 7 | 5 | 2[1] | 400 | — | 310 | 3,340 | 10 |
| Singly encased | 20 | — | 400 | 2,600 | 390 | 3,440 | 10 |
| Slab SBR 1502 | — | — | 500 | 2,720 | 380 | 3,450 | 10 |

[1]Calcium stearate.

to the same formulation as above with the exception that it contained only 30 parts carbon black.

The powdered elastomer containing formulations were fed directly to a Newberry injection molding machine, model number H3–50RS with a masticating type screw. See T. P. Abbott et al., supra, for exact conditions and method.

The resulting rubbers were analyzed in accordance with ASTM, Table 3.

EXAMPLE 16

The formulations described in Example 15 containing the powdered elastomer of Example 3, and the singly encased powdered oe SBR 1713 containing 20 phr starch xanthate were milled and compression molded in accordance with ASTM D15. A formulation containing 100 parts slab oe SBR 1713, 50 parts IRB No. 3 carbon black, 1 part phenyl-beta-naphthylamine, 1 part stearic acid, 4 parts ZnO, 2 parts sulfur, 0.75 part benzothiazyl disulfide, 0.75 part diphenyl guanidine, and 5 parts naphthenic oil were mixed, milled, and compression molded in accordance with ASTM D15. The above rubbers were tested in accordance with ASTM 412, Table 4.

of starch xanthate and zinc starch xanthate having xanthate degrees of substitution of from 0.2 to 3.0, cationic starch, and their cereal flour analogs with 100 parts of latex solids contained in a latex selected from the group consisting of natural rubber latex, chloroprene latex, polybutadiene latex, styrenebutadiene rubber latex, butadiene-acrylonitrile rubber latex, oil-extended styrene-butadiene rubber latex, and phenol-formaldehyde-extended nitrile rubber latex to form a coprecipitate having a particle diameter of about 1 mm.;

b. filtering and water washing the coprecipitate resulting from (a);
c. washing the coprecipitate resulting from step (b) with a water-miscible solvent;
d. filtering the washed coprecipitate resulting from step (c); and
e. repeating steps (c) and (d) until the filtrate resulting from step (d) contains from 0 to 10 percent water; an improvement comprising, as an additional step prior to step (c), supra, resuspending the coprecipitate resulting from step (b), supra, in water and precipitating, in the presence of the resuspended coprecipitate, from 1 to 17 parts per 100 parts of latex solids (phr) of a second encasement compound selected from the group consisting Table 3

| Rubber | Encasement phr 1st | 2nd | Moduli 100% | 300% | Elongation, % | Tensile, p.s.i. | Set (10 min.), % |
|---|---|---|---|---|---|---|---|
| Example 3 | 4 | 2 | 720 | — | 240 | 2,080 | 20 |
| Singly encased | 20 | — | 440 | 1,800 | 350 | 2,120 | 30 |

Table 4

| Rubber | Encasement phr 1st | 2nd | Moduli 100% | 300% | Elongation, % | Tensile p.s.i. | Set (10 min.), % |
|---|---|---|---|---|---|---|---|
| Example 3 | 4 | 2 | 440 | 2,000 | 350 | 2,400 | 30 |
| Singly encased | 20 | — | 400 | 1,700 | 470 | 2,880 | 35 |
| Slab oe SBR 1713 | — | — | 240 | 1,560 | 420 | 2,200 | 25 |

I claim:

1. In a process for preparing powdered elastomer compositions having the following steps:
   a. coprecipitating from 3 to 19 parts of a first encasement compound selected from the group consisting of starch xanthate and zinc starch xanthate having xanthate degrees of substitution of from 0.2 to 3.0, cationic starch, their cereal flour analogs, and sodium stearate, the total amount of first and second encasement compounds being from 4 to 20 phr.

2. A process as described in claim 1 wherein the resuspended coprecipitate is encased in calcium stearate by reacting sodium stearate with a water-soluble calcium or zinc salt in the presence of said resuspended coprecipitate at a pH of from 6 to 7.5.

3. A process as described in claim 1 wherein the resuspended coprecipitate is encased in starch xanthide by reacting starch xanthate and sodium nitrite in the presence of said resuspended coprecipitate at a pH of from about 2 to 6.

4. A process as described in claim 1 wherein the resuspended coprecipitate is encased in zinc starch xanthide by reacting starch xanthate with a water-soluble zinc salt at a pH of from 4 to 6.5.

5. A process as described in claim 1 wherein the first encasement compound is present in amounts of from 3 to 7 phr, the second encasement compound is present in amounts of from 1 to 5 phr, and the total amount of first and second encasement compounds being from 4 to 8 phr.

6. A process as described in claim 1 wherein the first encasement compound is present in amounts of from 3 to 5 phr, the second encasement compound is present in amounts of from 1 to 3 phr, and the total amount of first and second encasement compounds being from 4 to 6 phr.

* * * * *